United States Patent
Romig et al.

(10) Patent No.: US 7,355,161 B2
(45) Date of Patent: Apr. 8, 2008

(54) SYSTEMS AND METHODS FOR CONTROLLING WINDOWS WITH VARIABLE LIGHT TRANSMISSION

(75) Inventors: Emma Romig, Seattle, WA (US); Edward W. Gillette, Marysville, WA (US); Brian D. Kelly, Redmond, WA (US); Craig Loges, Marysville, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/383,372

(22) Filed: May 15, 2006

(65) Prior Publication Data

US 2008/0048101 A1  Feb. 28, 2008

Related U.S. Application Data

(63) Continuation of application No. 11/300,953, filed on Dec. 15, 2005.

(51) Int. Cl.
```
G06M 7/00      (2006.01)
H01J 40/14     (2006.01)
G02B 5/30      (2006.01)
G02B 27/28     (2006.01)
G02B 7/18      (2006.01)
G02B 27/00     (2006.01)
```
(52) U.S. Cl. ............ 250/221; 359/493; 359/601; 359/512

(58) Field of Classification Search ......... 250/214 AL, 250/214 B, 214 C, 201.1, 221; 359/489, 359/493, 497, 501, 589, 590, 601, 603, 604, 359/607–609, 613, 614, 839, 843, 265–277
See application file for complete search history.

(56) References Cited

U.S. PATENT DOCUMENTS 3,330,506 A  7/1967  Robillard et al.

(Continued)

FOREIGN PATENT DOCUMENTS

JP  2004003135  1/2004

OTHER PUBLICATIONS

Bonsor, "How Smart Windows Work", retrieved on Jun. 14, 2006 at <<http://electronics.howstuffworks.com/smart-window.htm/printable>>, HowStuffWorks, Inc., pp. 1-9.

(Continued)

*Primary Examiner*—Thanh X. Luu
*Assistant Examiner*—Suezu Ellis
(74) *Attorney, Agent, or Firm*—Lee & Hayes, PLLC

(57) ABSTRACT

Systems and methods for controlling windows with variable light transmission are disclosed. In one embodiment, a system includes a sensor adapted to receive a light intensity, a user input device adapted to receive a user input value, a window having a variable transmissivity portion, and a control system. The control system is operatively coupled to the sensor, the user input device, and the window, and is adapted to receive the light intensity and user input value and to adjust a transmission level of the variable transmissivity portion of the window based on at least one of the light intensity and the user input value. The sensor includes a sensor adapted to receive a light intensity, a temperature, a humidity, or other environmental variables. In other embodiments, the system also includes a ventilation system, an air conditioning system, or a humidity control system.

20 Claims, 13 Drawing Sheets

U.S. PATENT DOCUMENTS

| | | | |
|---|---|---|---|
| 3,370,813 A | | 2/1968 | Albertine et al. |
| 4,135,790 A | | 1/1979 | Takahashi et al. |
| 4,214,820 A | | 7/1980 | Leibowitz et al. |
| 4,229,080 A | | 10/1980 | Take et al. |
| 4,286,308 A | * | 8/1981 | Wolff .......................... 362/465 |
| 4,893,908 A | | 1/1990 | Wolf et al. |
| 4,993,810 A | | 2/1991 | Demiryont |
| 5,042,923 A | | 8/1991 | Wolf et al. |
| 5,069,535 A | | 12/1991 | Baucke et al. |
| 5,097,358 A | | 3/1992 | Ito et al. |
| 5,108,048 A | | 4/1992 | Chang |
| 5,347,434 A | | 9/1994 | Drake |
| 5,384,653 A | * | 1/1995 | Benson et al. ............... 359/270 |
| 5,457,564 A | | 10/1995 | Leventis et al. |
| 5,598,293 A | | 1/1997 | Green |
| 5,642,022 A | | 6/1997 | Sanz et al. |
| 5,654,786 A | * | 8/1997 | Bylander ..................... 351/49 |
| 5,699,192 A | | 12/1997 | Van Dine et al. |
| 5,724,176 A | | 3/1998 | Nishikitani et al. |
| 5,729,379 A | | 3/1998 | Allemand et al. |
| 5,750,282 A | | 5/1998 | Chi et al. |
| 5,764,402 A | | 6/1998 | Thomas et al. |
| 5,805,330 A | | 9/1998 | Byker et al. |
| 5,838,483 A | | 11/1998 | Teowee et al. |
| 5,878,809 A | | 3/1999 | Heinle |
| 5,883,220 A | | 3/1999 | Armand et al. |
| 5,888,431 A | | 3/1999 | Tonar et al. |
| 5,923,456 A | | 7/1999 | Tench et al. |
| 6,005,705 A | | 12/1999 | Schmidt et al. |
| 6,011,642 A | | 1/2000 | Vink et al. |
| 6,056,410 A | | 5/2000 | Hoekstra et al. |
| 6,130,772 A | * | 10/2000 | Cava .......................... 359/270 |
| 6,136,161 A | | 10/2000 | Yu et al. |
| 6,178,034 B1 | | 1/2001 | Allemand et al. |
| 6,197,923 B1 | | 3/2001 | Yamamoto |
| 6,222,177 B1 | * | 4/2001 | Bechtel et al. .......... 250/214 B |
| 6,246,505 B1 | * | 6/2001 | Teowee et al. ............. 359/241 |
| 6,280,882 B1 | | 8/2001 | Vallee et al. |
| 6,296,973 B1 | | 10/2001 | Michot et al. |
| 6,297,900 B1 | | 10/2001 | Tulloch et al. |
| 6,317,248 B1 | | 11/2001 | Agrawal et al. |
| 6,327,070 B1 | | 12/2001 | Heuer et al. |
| 6,433,913 B1 | | 8/2002 | Bauer et al. |
| 6,471,360 B2 | | 10/2002 | Rukavina et al. |
| 6,493,128 B1 | * | 12/2002 | Agrawal et al. ............ 359/265 |
| 6,501,587 B1 | | 12/2002 | Ferraris et al. |
| 6,515,787 B1 | | 2/2003 | Westfall et al. |
| 6,535,126 B2 | | 3/2003 | Lin et al. |
| 6,541,156 B1 | | 4/2003 | Fuse et al. |
| 6,561,460 B2 | | 5/2003 | Rukavina et al. |
| 6,567,708 B1 | | 5/2003 | Bechtel et al. |
| 6,580,472 B1 | | 6/2003 | Willingham et al. |
| 6,587,250 B2 | | 7/2003 | Armgarth et al. |
| 6,594,065 B2 | | 7/2003 | Byker et al. |
| 6,639,708 B2 | | 10/2003 | Elkadi et al. |
| 6,707,590 B1 | | 3/2004 | Bartsch |
| 6,747,780 B2 | | 6/2004 | Xu et al. |
| 6,783,099 B2 | | 8/2004 | Rukavina et al. |
| 6,795,226 B2 | | 9/2004 | Agrawal et al. |
| 6,819,367 B1 | * | 11/2004 | Cava .......................... 349/16 |
| 6,822,778 B2 | | 11/2004 | Westfall et al. |
| 6,843,068 B1 | | 1/2005 | Wacker |
| 6,848,653 B2 | | 2/2005 | Finke et al. |
| 6,954,300 B2 | | 10/2005 | Varaprasad et al. |
| 7,001,868 B2 | | 2/2006 | Sawano |
| 7,256,923 B2 | | 8/2007 | Liu et al. |
| 7,300,166 B2 | | 11/2007 | Agrawal et al. |
| 2002/0044331 A1 | | 4/2002 | Agrawal et al. |
| 2002/0080290 A1 | | 6/2002 | Nihel |
| 2002/0118437 A1 | | 8/2002 | Rukavina et al. |
| 2002/0135881 A1 | | 9/2002 | Rukavina et al. |
| 2002/0196518 A1 | | 12/2002 | Xu et al. |
| 2002/0196519 A1 | | 12/2002 | Elkadi et al. |
| 2003/0047457 A1 | | 3/2003 | Rukavina et al. |
| 2003/0174377 A1 | | 9/2003 | Reynolds et al. |
| 2003/0184692 A1 | | 10/2003 | Nagae |
| 2003/0192991 A1 | | 10/2003 | Rukavina et al. |
| 2003/0209893 A1 | | 11/2003 | Breed et al. |
| 2003/0233172 A1 | | 12/2003 | Granqvist et al. |
| 2004/0001056 A1 | | 1/2004 | Atherton et al. |
| 2004/0021928 A1 | | 2/2004 | Warner et al. |
| 2005/0068629 A1 | | 3/2005 | Fernando et al. |
| 2005/0200933 A1 | | 9/2005 | Weidner |
| 2005/0200934 A1 | | 9/2005 | Callahan et al. |
| 2005/0200937 A1 | | 9/2005 | Weidner |
| 2005/0270619 A1 | | 12/2005 | Johnson et al. |

OTHER PUBLICATIONS

"Electrochromism", retrieved on Jun. 15, 2006 at <<http://en.wikipedia/org/w/index.php?title=Electrochromism&oldid=53466702>>, Wikipedia, The Free Encyclopedia, Wikimedia Foundation, Inc., May 16, 2006.

"InspecTech Aero Service Acquires License From Research Frontiers to Produce SPD Aircraft Windows Which Save Energy, Reduce Costs of Operation, and Promote Passenger Comfort", retrieved on Jun. 15, 2006 at <<http://www.findarticles.com/p/articles/mi_m0EIN/is_2001_March_22/ai_72047362>>, Business wire, business, Airline and Aerospace Editors, Mar. 22, 2001, pp. 1-4.

Knight, "Smart Glass Blocks Infrared When Heat is On", retrieved on Aug. 9, 2004 at <<www.newscientist.com/article.ns?id=dm6256&print=true>>, pp. 1-2.

Liu, et al., "Design of Smart Window based on Electrochromic Polymers: New Derivatives of 3,4-alkylenedioxythiophene", electroactive Polymer Actuators and Devices (EAPAD), edited by Bar-Cohen, Y., Proceedings of the SPIE, vol. 5385, pp. 454-460, (Jul. 2004).

Sapp, et al., "High Contrast Ratio and Fast-Switching Dual Polymer Electrochromic Devices", 1998, Chem. Mater, 10:2101-2108.

Schwendeman, et al., "Combined Visible and Infrared Electrochromism Using Dual Polymer Devices", 2001, Advanced Materials 13:9, pp. 634-637.

"Smart windows", retrieved on Jun. 15, 2006 at <<http://em.wikipedia.org/w/index.php?title=Smart_windows&oldid=57591898>>, Wikipedia, The Free Enclyclopedia, Wikimedia Foundation, Inc., Jun. 8, 2006.

Welsh, et al., "Enhanced Contrast Ratios and Rapid Switching in Electrochromics Based on Poly (3,4-propylenediozythiophene) Derivitives", Advanced Materials 11:16, 1379-1382.

Xu, et al., "Enhanced Smart Window Based on Electrochromic Polymers", Smart Structures and Materials 2003, Electroactive Polymer Actuators and Devices (EAPAD), edited by Bar-Cohen, Y., Proceedings of the SPIE, vol. 5051, pp. 404-411 (Jul. 2003).

Xu, et al., "Gel Electrolyte Candidates for Electrochromic Devices (ECD)", Smart Structures and Materials 2004, Electroactive Polymer Actuators and Devices (EAPAD), edited by Bar-Cohen, Y., Proceedings of the SPIE, vol. 5385, pp. 319-325, (Jul. 2004).

* cited by examiner

SYSTEMS AND METHODS FOR CONTROLLING WINDOWS WITH VARIABLE LIGHT TRANSMISSION

This application is a continuation of co-pending, commonly owned U.S. application Ser. No. 11/300,953, filed Dec. 15, 2005, which is incorporated herein by reference.

FIELD OF THE INVENTION

This invention relates generally to windows with variable light transmission, and more specifically, to systems and methods for providing windows with variable light transmission.

BACKGROUND OF THE INVENTION

Windows generally share a common function, whether glass or plastic and whether used in buildings, automobiles, aircraft, boats, motorcycle visors, or glasses: to permit light transmission into a physical structure. Users of vehicles such as automobiles, aircraft, boats, and planes, have especially benefited from the use of windows, as they provide protection from the elements while still permitting visual acuity.

Most conventional windows have only a single transmissivity state. Thus, whether it be rain or shine, dusk or dawn, or noon or night, most conventional windows transmit virtually all available light. Although this may be desirable in many circumstances, such as during periods of low light levels, in other circumstances it may be less than optimal. For example, as any vehicle operator has experienced, under some circumstances (e.g., a due east heading on a clear and crisp morning), this limitation of conventional windows becomes quite noticeable. When the vehicle is an aircraft, the pilot and other personnel located in the cockpit of the aircraft under such circumstance may experience discomfort and non-optimal visual capability.

Light to a pilot's eyes may come directly (from the sun) and indirectly (reflected from other surfaces), and may cause several problems for the pilot. Too much or too little light may undesirably reduce the visual acuity of the pilot. Rapid changes in light intensity may require rapid pupil diameter changes, and may cause the pilot to experience temporary visual acuity loss. Situations such as laser attacks or light reflections from other surfaces may combine more than one problem for a pilot, either too much light or too rapid a change in light intensity, or both.

Furthermore, radiation from across the electromagnetic spectrum may be released from the sun and absorbed by a pilot's skin in the form of heat. When a pilot absorbs too much heat, the pilot may experience discomfort and may have a reduced level of performance. "Gaspers" or vents are used by pilots to reduce body temperature. While these devices have some effectiveness, they function by convective cooling, which removes water vapor from skin and may cause skin to seem dry and cause discomfort. Additionally, multiple pilots in a cockpit may absorb different amounts of heat from the sun (for instance, if one is in direct sunlight and one is in shade) and therefore require different levels of cooling to remain comfortable, which is hard to achieve with vents.

Systems and methods for providing aircraft cockpit windows and the like with variable light transmission capability would therefore have utility.

SUMMARY OF THE INVENTION

Systems and methods for providing windows, including vehicle and building windows and the like, with variable light transmission within a desired range are disclosed. Embodiments of the present invention may advantageously provide adjustably controllable window transmissivity in airplane cockpits and the like, thereby reducing or eliminating one or more of the above-noted deficiencies that may be experienced using constant transmissivity windows.

In one embodiment, a system includes a sensor adapted to receive a light intensity, a user input device adapted to receive a user input value, a window having a variable transmissivity portion, and a control system. The control system is operatively coupled to the sensor, the user input device, and the window, and is adapted to receive the light intensity and user input value and to adjust a transmission level of the variable transmissivity portion of the window based on at least one of the light intensity and the user input value.

In another embodiment, a system includes a sensor adapted to receive a light intensity, a temperature, a humidity, or other environmental variable, a window having a variable transmissivity area, and a control system. The control system is operatively coupled to the sensor and the window, and is adapted to receive the sensor value and to adjust a transmission level of the variable transmissivity area of the window based on the sensor value.

In an additional embodiment, the system further includes an environment altering device other than an electrically dimmable window, such as a ventilation system, an air conditioning system, or a humidity control system. The control system is operatively coupled to the device and sends control signals to it based on the sensor and user input values.

In a further embodiment, the control system adjusts the transmissivity of a variable transmissivity area so that the light intensity is equal to or greater than a minimum threshold value and less than or equal to a maximum threshold value. The control system also evaluates the rate of change of light intensity, and adjusts the transmissivity as needed to keep the rate within an acceptable range.

In yet another embodiment, the control system automatically adjusts the various environment-altering devices to keep the light intensity, the rate of change of light intensity, the temperature, and the humidity within desired ranges. The control system then evaluates the user input, and if the user input is compatible with the desired ranges, the control system adjusts the environment-altering devices according to the user input.

BRIEF DESCRIPTION OF THE DRAWINGS

Embodiments of the present invention are described in detail below with reference to the following drawings.

DETAILED DESCRIPTION

The present invention relates generally to windows with variable light transmission, and more specifically, to systems and methods for controlling windows with variable light transmission within a desired range. Specific details of certain embodiments of the invention are set forth in the following description and in FIGS. 1-13 to provide a thorough understanding of such embodiments. It will be appreciated, however, that the present invention may have additional embodiments, or may be practiced without one or more of the details described for any particularly-described embodiment.

Embodiments of systems and methods in accordance with the present invention may provide considerable advantages over the prior art. For example, in a situation where there is too much light reaching a pilot's eyes, embodiments of the invention may replace or augment hats, visors, and sunglasses, prevent or reduce squinting, and reduce the risk of loss of visual acuity. Where the light intensity increases too quickly, embodiments of the invention may prevent or mitigate undesirable effects on the pilot by reducing the maximum intensity, and consequently the undesirable effects of rapid change. Alternate embodiments of the invention may also contribute to an increased thermal comfort of pilots in a cockpit. For example, a system in accordance with the present invention may reduce the total amount of radiation striking the skin of the pilots. Additionally, in a situation where one pilot is in direct sunlight and the other is in shade, embodiments of the invention may adjust the transmissivity of a plurality of windows in the cockpit to different transmissivity levels such that the amount of radiation striking the pilots is not only less, but also more equal. These and other advantages of the present invention may be achieved, as described more fully below.

Figure 1:
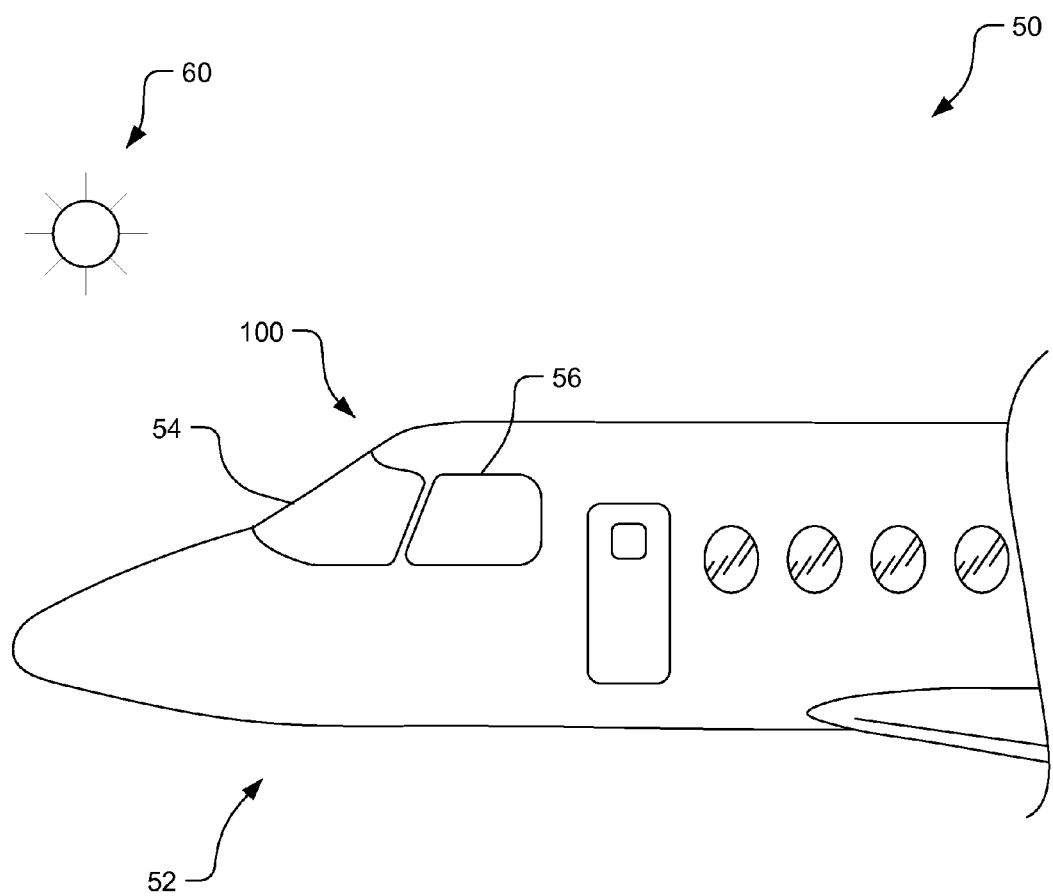
FIG. 1 is a side elevational view of an aircraft having a dimmable window system in accordance with an embodiment of the present invention.
Figure 2:
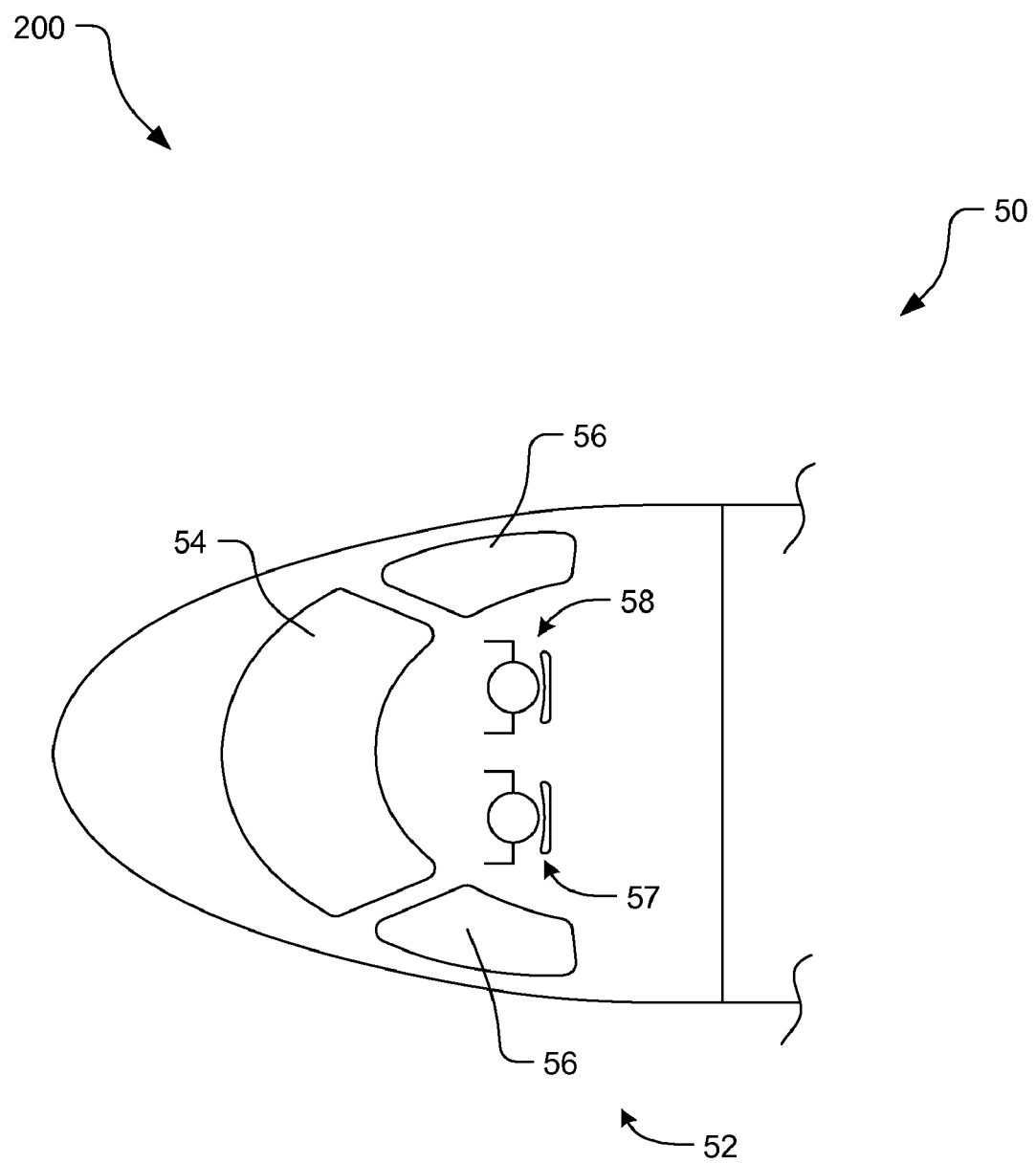
FIG. 2 is a top, partial sectional view of a cockpit portion of the aircraft of FIG. 1.
Figure 3:
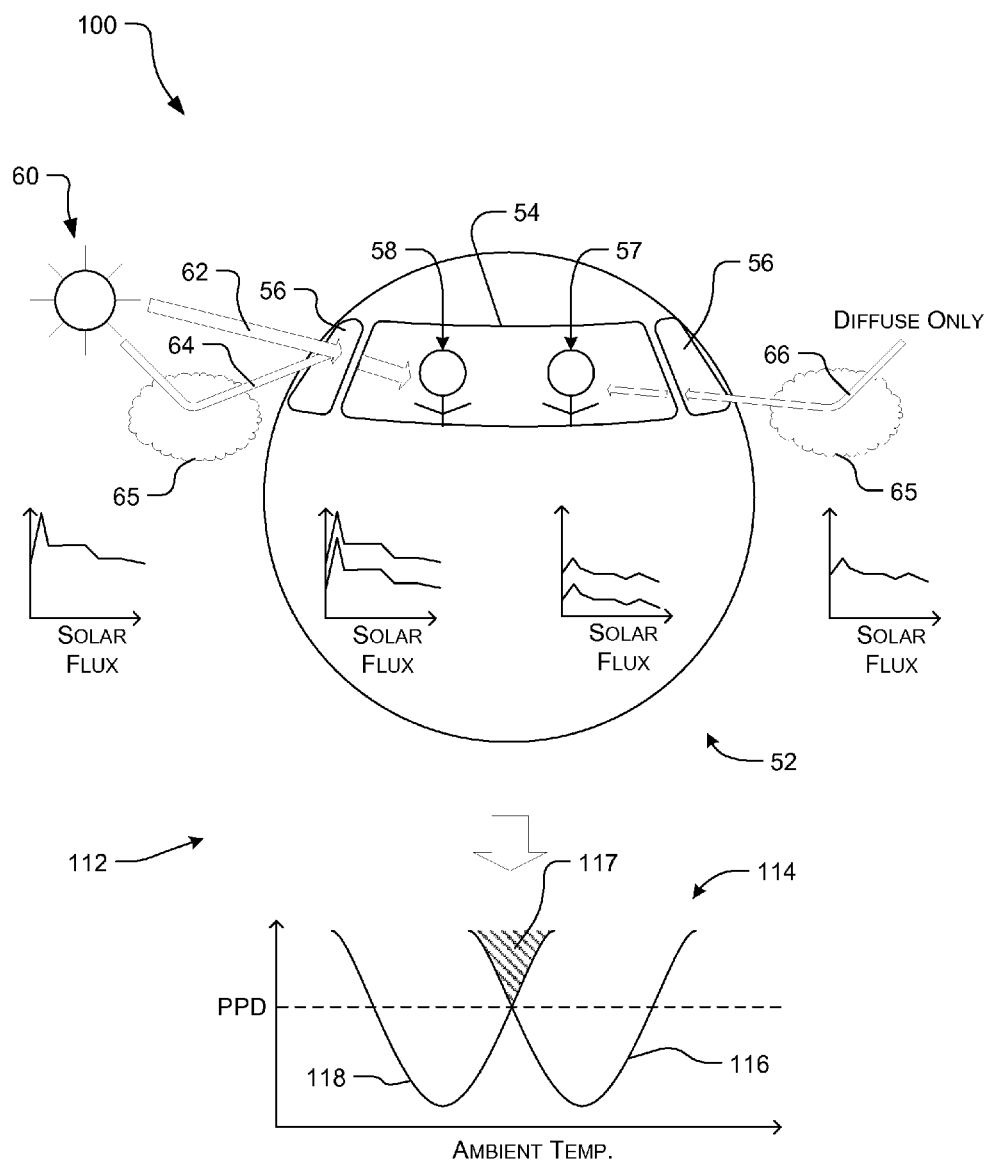
FIG. 3 is a front, partial sectional view of a cockpit portion of the aircraft of FIG. 1 with the dimmable window system in an initial (or non-activated) state in accordance with an embodiment of the invention.

FIG. 1 is a side elevational view of an aircraft 50 having a cockpit portion 52 that includes a dimmable window system 100 in accordance with an embodiment of the present invention. FIGS. 2 and 3 are top and front partial sectional views, respectively, of the cockpit portion 52 of the aircraft 50 of FIG. 1. In this embodiment, the cockpit portion 52 includes a front (or main) window 54 and a pair of side windows 56. A first pilot (or captain) 57 is positioned on a first side of the cockpit portion 52, and a second pilot (or co-pilot) 58 is positioned on a second side of the cockpit portion 52.

As shown in FIG. 3, light from the sun 60 may enter the cockpit portion 52 in several ways. A direct portion 62 may shine directly into the cockpit portion 52 from the sun 60, while an indirect portion 64 may be reflected from a cloud 65 or other reflective object into the cockpit portion 52. A diffuse portion 66 may also enter the cockpit portion 52 after following and undetermined path that may include a plurality of reflective and refractive transmission paths.

Figure 4:
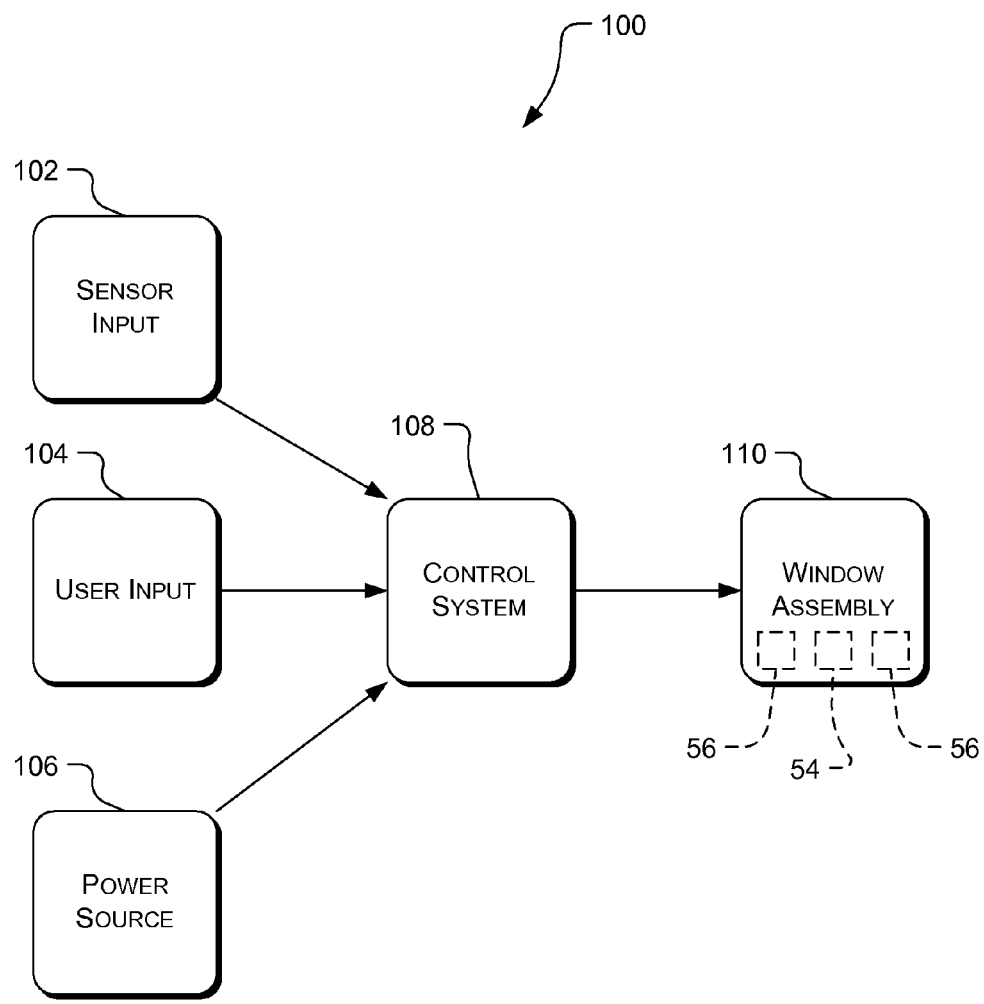
FIG. 4 is a schematic view of a dimmable window system in accordance with an embodiment of the invention.

FIG. 4 is a schematic view of the dimmable window system 100 of FIG. 1 in accordance with an embodiment of the invention. In this embodiment, the dimmable window system 100 includes a sensor assembly 102 adapted to receive a light measurement, and a control system 108 operatively coupled to the sensor assembly 102 and to a window assembly 110 that includes at least one of the cockpit windows (e.g., one or more of the front and side windows 54, 56). The sensor assembly 102 may consist of a single light-detecting device, or a plurality of light-detecting devices. Furthermore, the sensor assembly 102 may be positioned within the cockpit portion 52, or at some other desired location on the aircraft 50 (e.g., on an exterior of the cockpit portion 52, or formed within one or more of the windows 54, 56).

As further shown in FIG. 4, a user input device 104 and a power source 106 are coupled to the control system 108. In one embodiment, the user input device 104 is configured to receive a desired transmission level of the window assembly 110. In a particular embodiment, the user input device 104 includes an interface configured to receive discrete, continuous, or automatically determined values for the desired transmission level. The user input device 104 transmits the desired transmission level to the control system 108, wherein the control system 108 maintains a transmission level of the window assembly 110 in accordance with the desired transmission level.

The window assembly 110 generally includes at least one variable transmissivity portion. For example, in the embodiment shown in FIGS. 1-3, the front and side windows 54, 56 may all three be partially or entirely variably dimmable (or variably transmissible). Alternately, only select portions of the front and side windows 54, 56 may be variably dimmable. The dimmability (or variable transmissivity) of the window assembly 110 may be provided in any suitable manner. For example, in alternate embodiments, the window assembly 110 may include an electrochromic, a gel-type (e.g. Gentex™), a thin-film (e.g. St. Gobian™ or Sully™), or any other suitable technology that provides variably-controllable light transmission levels. More specifically, in alternate embodiments, the window assembly 110 may include any of those electrochromic devices, materials, and systems generally disclosed in U.S. Patent Application Publication No. 20020196518 entitled "Electrochromic Organic Polymer Syntheses and Devices Utilizing Electrochromic Organic Polymers", filed on Jun. 25, 2002, and in co-pending, commonly-owned U.S. patent application Ser. No. 10/974,240 entitled "Dimming Window Control Systems and Methods", U.S. patent application Ser. No. 10/974,088 entitled "Low Vapor Pressure Solvent for Electrochromic Devices", and to co-pending, commonly-owned U.S. patent application Ser. No. 10/974,251 entitled "Multi-Color Electrochromic Device", which applications were filed on Oct. 27, 2004 and are hereby incorporated by reference. In this manner, the window assembly 110 is provided with a dimmable or variably-controllable transmissivity.

Referring again to FIG. 3, in an initial (or non-activated) state 112, all of the windows 54, 56 of the window assembly 110 are in a non-dimmed (or non-activated) condition. In this initial state 112, the second pilot 58 may received a greater portion of the direct and indirect light 62, 64 from the sun 60, while the first pilot 57 may receive primarily diffuse light 66. Depending upon many variables, including the direction of travel of the aircraft 50 with respect to the sun 60, the angles of incidence of the light 62, 64, 66 upon the cockpit portion 52, as well as other factors, the light entering the cockpit portion 52 may result in asymmetrical heating of the pilots 57, 58. In other words, under some circumstances, the first pilot 57 may be "in the shade" while the second pilot 58 may be "in the sun." Furthermore, depending on a wide variety of variables, the first and second pilots 57, 58 may each have an individual "comfort level." In one particular embodiment, the comfort level of each of the first and second pilots 57, 58 may be expressed as a Predicted Percent Dissatisfied (PPD) value, as defined in *Thermal Comfort, Analysis and Applications in Environmental Engineering*, by P. O. Sanger. As shown in FIG. 3, in the initial (or non-activated) state 112, a first graph 114 of PPD versus ambient temperature $T_{AMB}$ within the cockpit portion 52 shows that a first comfort level 116 of the first pilot 57 may have only a small "overlapping comfort" portion 117 with a second comfort level 118 of the second pilot 58.

With reference to FIG. 4, the sensor assembly 102 is configured to receive the input light measurement, and to transmit this information to the control system 108. In turn, the control system 108 receives the light intensity measurements from the sensor 102, in addition to the desired transmission level from the user input device 104. The control system 108 may automatically maintain or adjust the transmission level of one or more window portions of the window assembly 110 in accordance with the desired transmission level from the user input device 104 and the light intensity measurements from the sensor assembly 102. In one particular embodiment, the control system 108 adjustably controls the transmissivity of the window assembly 110 by varying a voltage value provided by the power source 106 to one or more variably-controllable transmissivity portions of the windows 54, 56.

Figure 5:
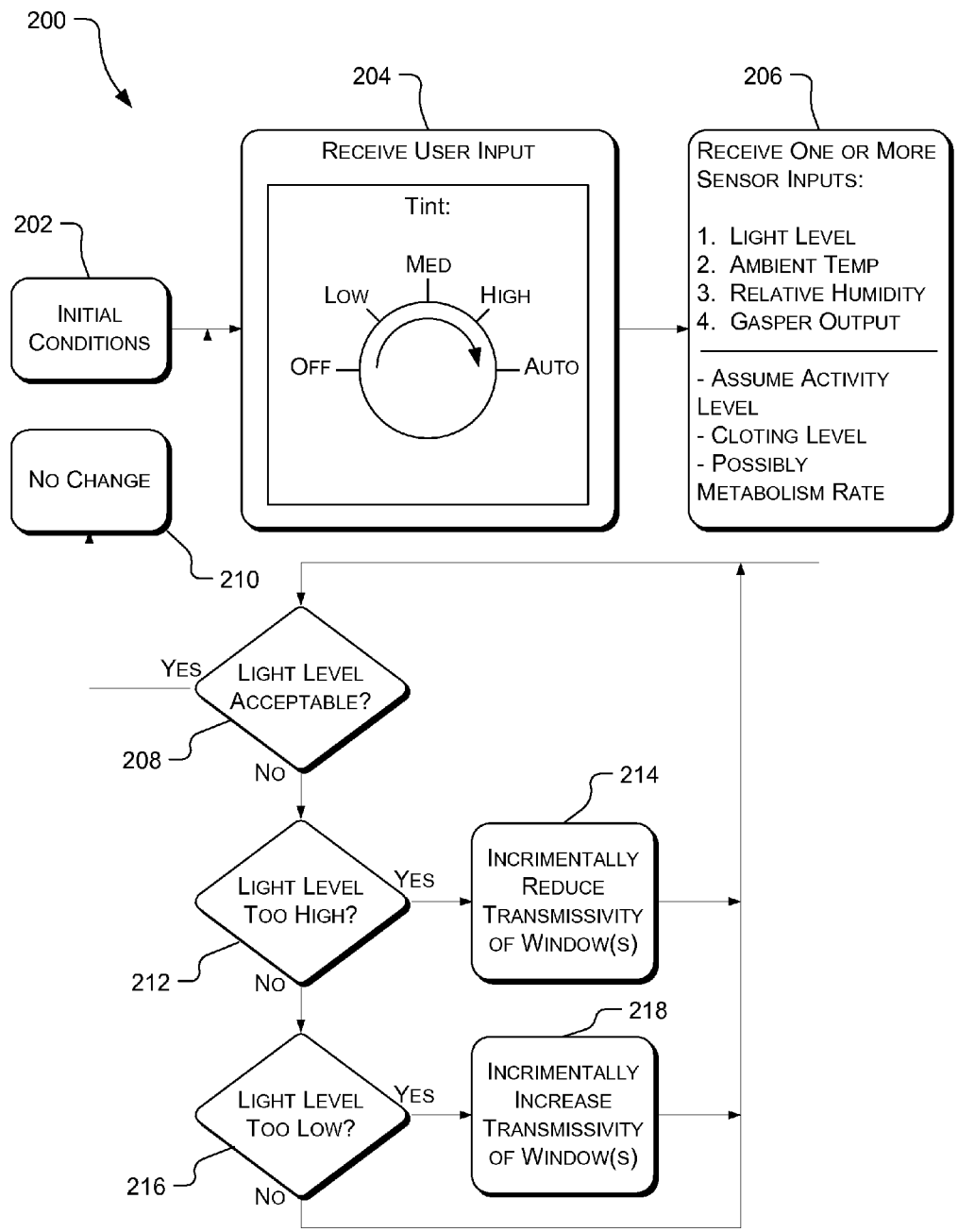
FIG. 5 is a flow chart showing a method of controlling light levels within a cockpit portion of an aircraft in accordance with an embodiment of the invention.

FIG. 5 is a flow chart showing a method 200 of controlling a light level within the cockpit portion 52 of the aircraft 50 in accordance with an embodiment of the invention. In this embodiment, the method 200 includes beginning at initial conditions at a block 202. For example, in one particular embodiment, the initial conditions (block 202) may be the initial state 112 shown in FIG. 3. At block 204, a user input is received from the user input device 104 (FIG. 4). As shown in FIG. 5, in one particular embodiment, the user input may be received from an analog control device allowing the user (e.g., the first or second pilots 57, 58) to select a specified level of window tint (e.g., low, medium, high, etc.) or to select an "automatic" setting that defers control of the transmissivity of the window assembly 110 to the control system 108.

At a block 206, one or more sensor inputs are received by the control system 108 from the sensor assembly 102 (FIG. 4). The one or more sensor inputs may include, for example, a light level, an ambient temperature $T_{AMB}$, a relative humidity, a metabolic rate, a pulse rate, a body temperature, or any other physiological characteristics or indicators of comfort, or any other desired inputs. In alternate embodiments, block 206 may also include receiving one or more assumed inputs (e.g., acidity level, clothing level, metabolic rate, etc.) that may be considered or used by the control system 108.

As further shown in FIG. 5, the method 200 determines whether the light level within the cockpit portion 52 is at an acceptable level (or within an acceptable range) at a block 208. If the light level is at an acceptable level (or within an acceptable range), then the control system 108 determines that no change is needed in the transmissivity levels of the window assembly 110 at block 210, and the method 200 returns to receiving user inputs at block 204.

If the method 200 determines that the light level in the cockpit portion 52 is not acceptable at block 208, then the method 200 determines whether the light level it is too high at block 212. If the light level within the cockpit portion 52 is too high, then the control system 108 incrementally reduces the transmissivity of one or more window portions of the window assembly 110 at block 214, and returns to the determination block 208 to determine whether the light level in the cockpit portion 52 is now acceptable. In one particular embodiment, the control system 108 will only reduce the transmissivity of the one or more window portions of the window assembly 110 down to a lower acceptable limit. For example, the lower acceptable limit may be selected such that visibility through the one or more window portions is never reduced below a minimally acceptable threshold. The method 200 repeats blocks 208 through 214 until the light level within the cockpit portion is determined to be acceptable at block 208 (or the transmissivity cannot be reduced any further), and the method 200 returns to block 204 (via block 210).

Similarly, if the method 200 determines that the light level within the cockpit portion is not too high at block 212, then the method 200 proceeds to block 216 to determine whether the light level is too low. If the light level is too low, then the method 200 incrementally increases the transmissivity of the one or more window portions of the window assembly 110 at block 218 in order to increase the light level within the cockpit portion 52, and returns to the determination block 208 to determine whether the light level within the cockpit portion is acceptable. The method 200 may repeat block 208, 212, 216, and 218 until the light level within the cockpit portion 52 is determined to be acceptable, or until the control system 108 determines that the transmissivity of the one or more window portions of the window assembly 110 has reached a maximum value (e.g., a non-tinted condition) and the dimmable window system 100 is not able to further increase the light level within the cockpit portion 52. Upon determining that the light level within the cockpit portion 52 has reached an acceptable level (block 208), or upon determining that the transmissivity of the one or more window portions of the window assembly 110 has reached a maximum value, the method 200 returns to block 204 (via block 210).

Figure 6:
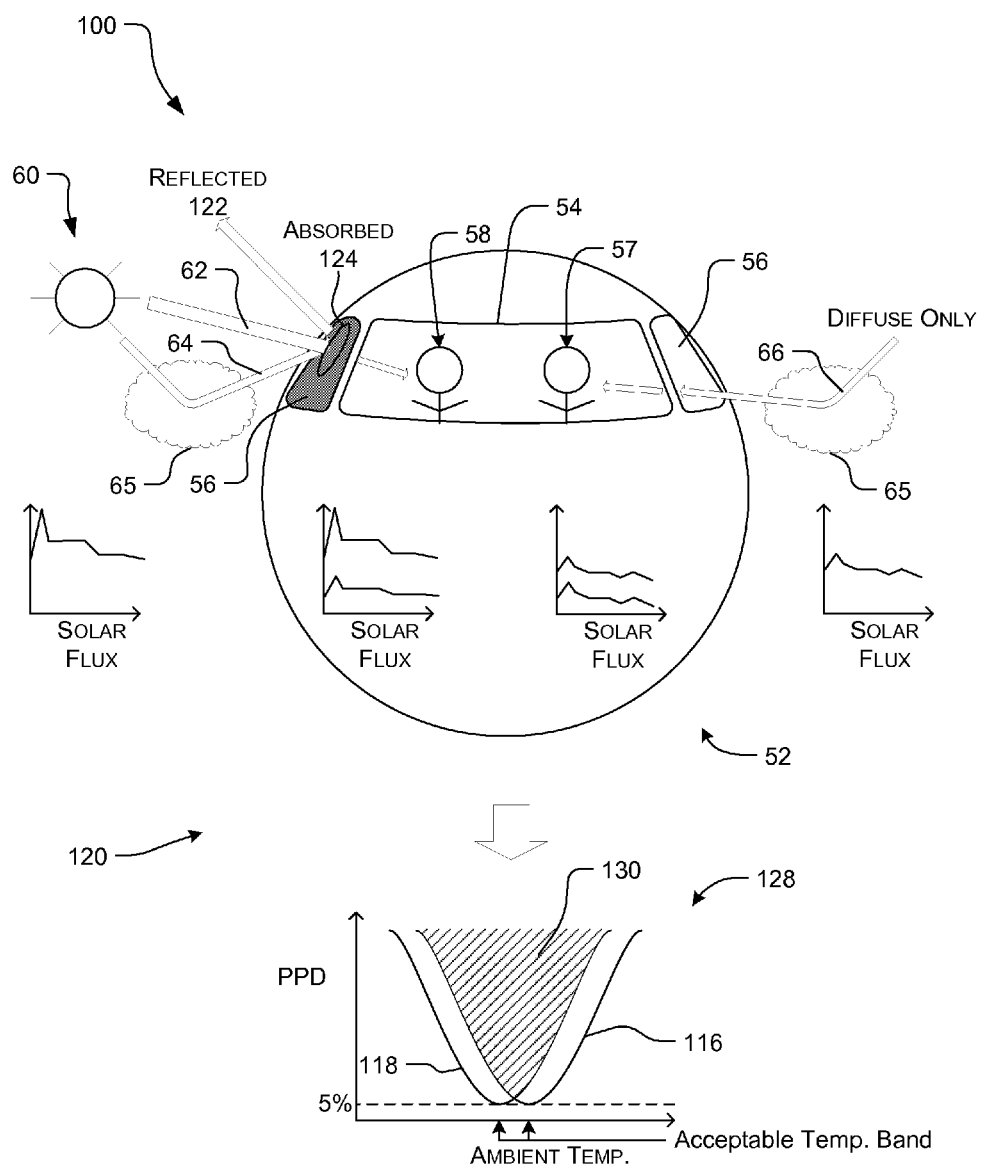
FIG. 6 is a front partial sectional view of the cockpit portion of the aircraft of FIG. 1 with the dimmable window system in a second (or activated) state in accordance with another embodiment of the invention.

FIG. 6 is a front partial sectional view of the cockpit portion 52 of the aircraft 50 of FIG. 1 with the dimmable window system 100 in a second (or activated) state 120. In this embodiment, the dimmable window system 100 has been activated by the control system 108 so that the side window 56 adjacent to the second pilot 58 is darkened (or tinted), reducing the transmissivity of this side window 56 so that the direct and indirect light components 62, 64 from the sun 60 are greatly reduced. More specifically, by reducing the transmissivity of the side window 56 adjacent to the second pilot 58, a reflected component 122 is increased, an absorbed component 124 absorbed within the side window 56 is increased, while a transmitted component 126 is reduced in comparison with a transmitted component 67 in the initial state 112 (FIG. 3).

Furthermore, a second graph 128 of PPD versus ambient temperature TAB within the cockpit portion 52 shows that an "overlapping comfort" portion 130 of the first comfort level 116 of the first pilot 57 and the second comfort level 118 of the second pilot 58 has been increased in comparison with the relatively smaller overlapping portion 117 of the initial state 112 (FIG. 3). In one alternate embodiment, an acceptable temperature range $T_{BAND}$ may be derived from the second graph 128, which may be used by the control system 108 during the determination of whether the light level in the cockpit portion 52 is within the acceptable range (e.g. block 208 of FIG. 5). In a further embodiment, an alternate method may determine whether the ambient temperature $T_{AMB}$ (rather than the light level) within the cockpit portion 52 is within an acceptable range, such as within the acceptable temperature range $T_{BAND}$.

In another alternate embodiment, the user inputs from the user input device 104 (block 204) may be eliminated. In this embodiment, the sensor assembly 102 measures interior light intensity measurements, and the control system 108 automatically maintains the transmission levels of the one or more window portions of the window assembly 110 at suitable transmission levels unless the desired transmission level renders the interior light intensity measurements below a predetermined (or minimum desired) threshold. When the desired transmission level results in the light intensity measurements being below the certain threshold, the control system 108 adjusts (e.g., increases) the transmission level of one or more window portions of the window assembly 110 to any level that results in the light intensity measurements being at or above the certain threshold. The control system 108 may periodically or continuously evaluate the light intensity measurements provided by the sensor assembly 102, and may periodically or continuously adjust the transmission level of the window assembly 110 when the light intensity measurements fall below the certain threshold.

In yet another embodiment, the control system 108 may be further adapted to adjust the transmissivity of the window assembly 110 based on a second predetermined threshold, such as, for example, a maximum allowable (or maximum desired) light intensity measurement. More specifically, the sensor assembly 102 may measure a light intensity (e.g. within the structure) that exceeds a maximum desired threshold. When the control system 108 determines that the measured light intensity has exceeded the maximum desired threshold, the control system 108 may automatically adjust (e.g., decrease) the transmissivity of one or more window portions of the window assembly 110 to lower the measured light intensity. In a particular embodiment, the dimmable window system 100 may be employed in a vehicle, such as a cockpit of an aircraft, and may be used to provide protection to the pilot (or other vehicle operator) from a laser or other source of high intensity light.

In yet another embodiment, the dimmable window system 100 may be configured with a fail-safe mechanism. In this embodiment, if any component of the dimmable window system 100 experiences a problem, the fail-safe mechanism (e.g., a component of the control system 108) may automatically default the transmission level of the window assembly 110 to a predetermined acceptable level. In some embodiments, such as in a cockpit of an aircraft, the predetermined acceptable level may be a relatively-high transmission level that provides normal, non-attenuated visibility levels to the pilots 57, 58 within the cockpit portion 52. In alternate embodiments, however, the fail-safe mechanism may result in reduced transmissivity, in comparison with a normal, non-attenuated visibility level.

Figure 11:
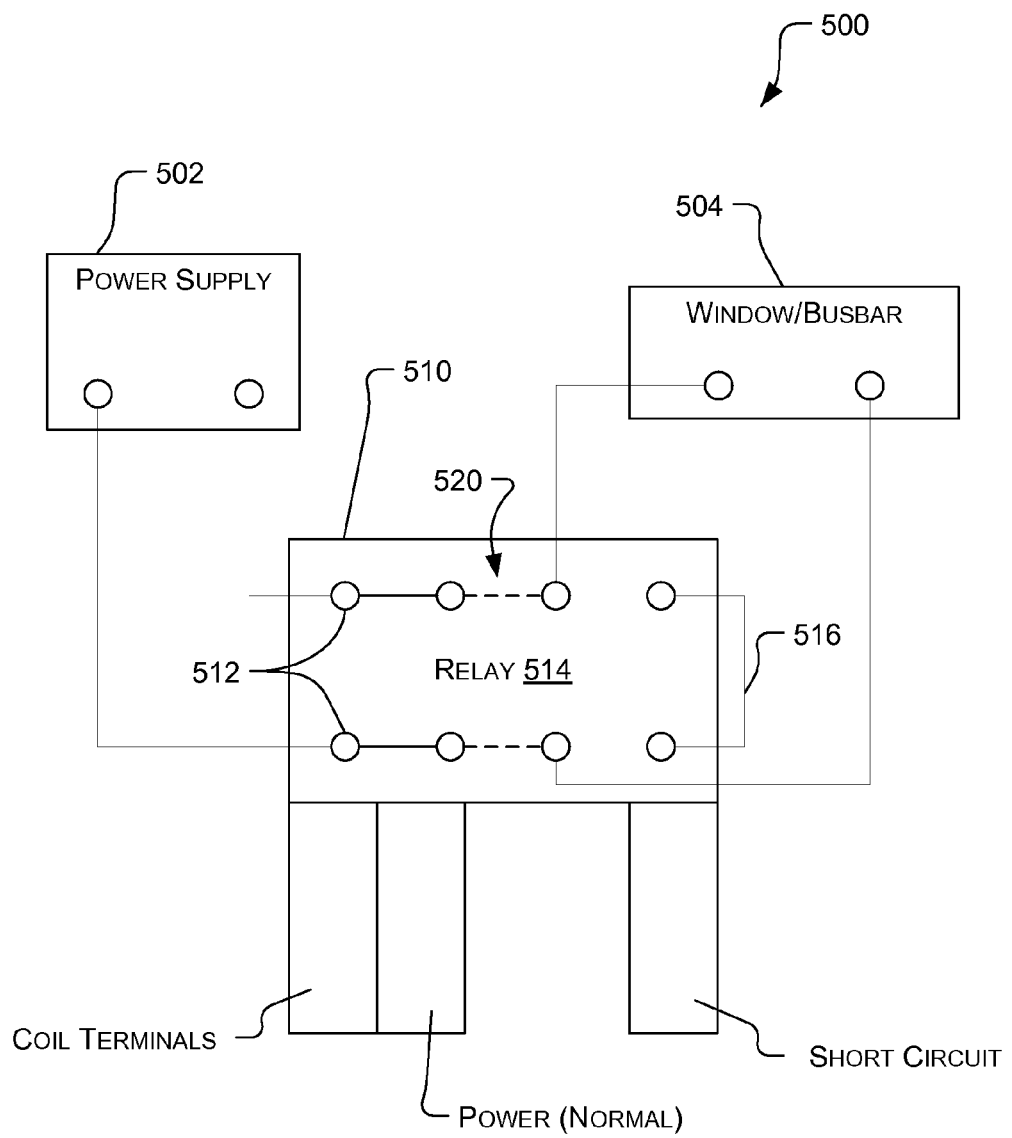
FIGS. 11-13 are schematic views of fail-safe mechanisms for dimmable window systems in accordance with alternate embodiments of the invention.
Figure 12:
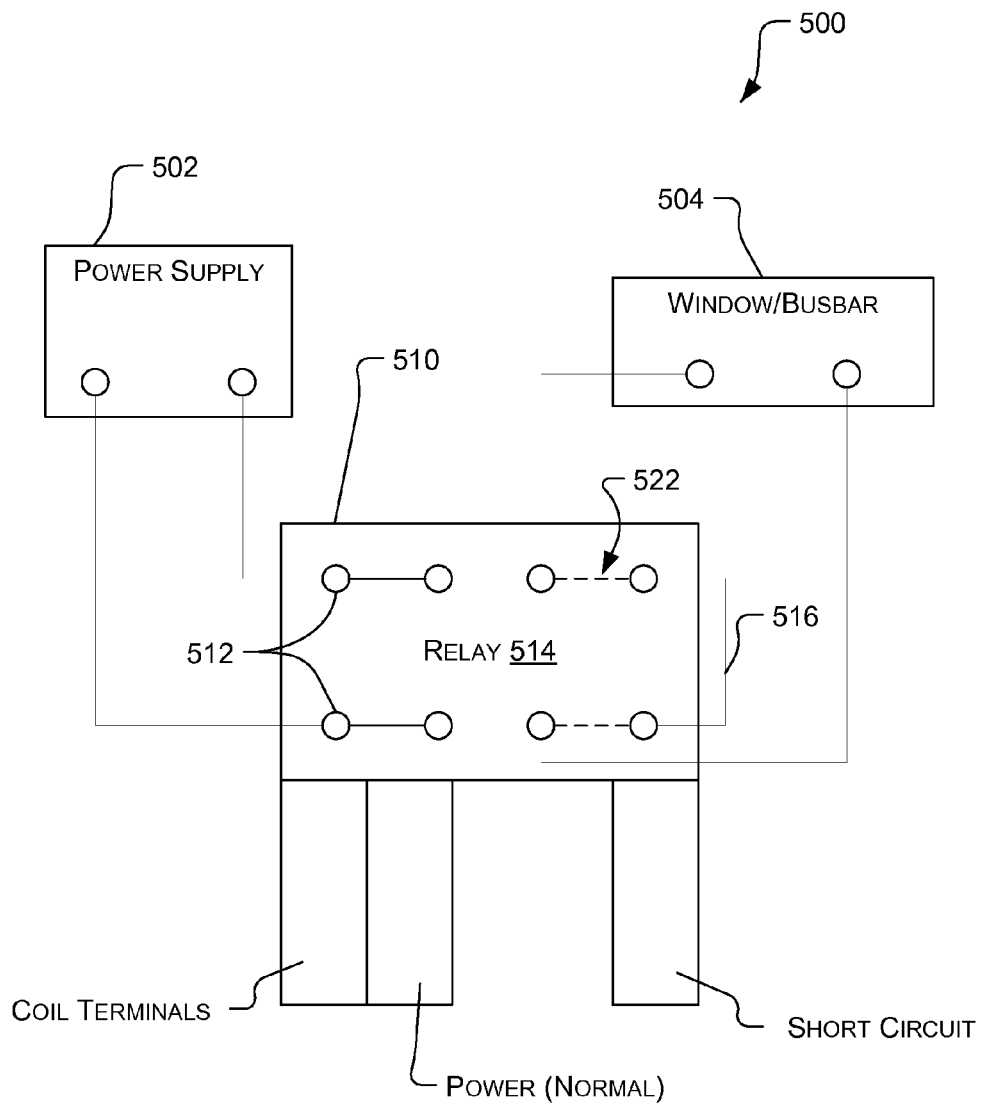

For example, FIG. 11 is a schematic view of a fail-safe mechanism 500 for a dimmable window system in accordance with another embodiment of the invention. In this embodiment, the fail-safe mechanism 500 includes a control circuit 510 operatively coupled between a power supply 502 and a dimmable window portion 504. The control circuit 510 includes a pair of terminals 512 that are coupled to the power supply 502, and a relay 514 coupled to the terminals 512. Under a normal operating condition 520 (FIG. 11), the relay 514 routes electrical power from the power supply 502 to the dimmable window portion 504. In a failure condition 522 (FIG. 12), however, such as the possibility that electrical power from the power supply 502 is interrupted, the relay 514 is de-actuated and the dimmable window portion 504 is short circuited across a short circuit 516, thereby un-dimming (or clearing) the dimmable window portion 504. Thus, in this embodiment, the fail-safe mechanism 500 advantageously provides a non-dimmed (or clear) condition of the dimmable window portion 504 in the event of a failure condition 522. In alternate embodiments, an equivalent electronic device maybe used in place of the relay 514.

Figure 13:
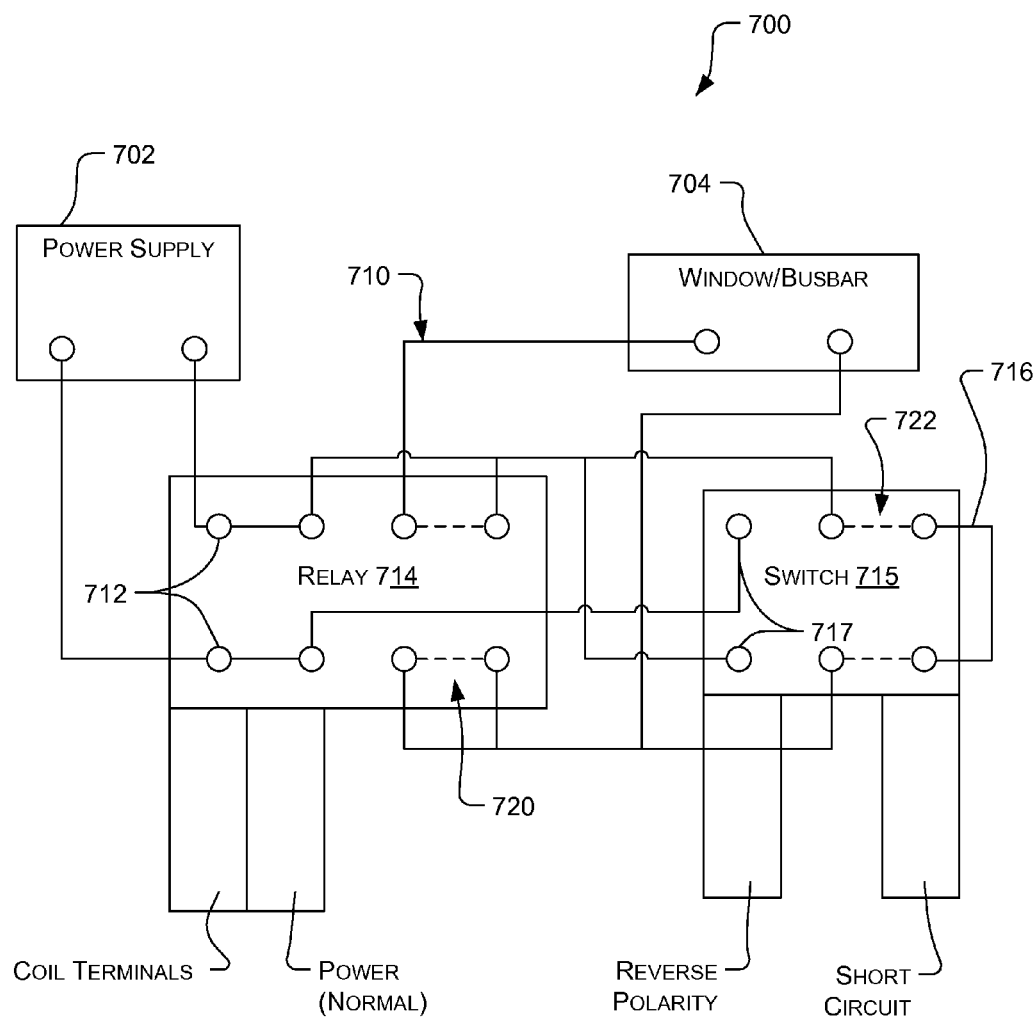

It will be appreciated that some dimmable window technologies can be cleared (or un-dimmed) more quickly by reversing the polarity of the power applied to the dimmable window portion, rather than by simply short-circuiting the power as described above with respect to FIGS. 11 and 12. FIG. 13 is a schematic view of a fail-safe mechanism 700 adapted to reverse the polarity applied to a dimmable window system in accordance with yet another embodiment of the invention. In this embodiment, the fail-safe mechanism 700 includes a control circuit 710 operatively coupled between a power supply 702 and a dimmable window portion 704. The control circuit 710 includes a pair of terminals 712 that are coupled to the power supply 702, and a relay 714 coupled between the terminals 712 and a dimmable window portion 704. A switch 715 is also coupled to the dimmable window portion 704 and to a short circuit 716, and includes a pair of reverse polarity terminals 717 coupled to the power supply 702 is further coupled to a short circuit 716. Under a normal operating condition 720, the relay 714 routes electrical power from the power supply 702 to the dimmable window portion 704, enabling the dimmable window portion 704 to exist in a dimmed or reduced transmissivity condition. In a failure condition 722, however, such as a collision avoidance mode of operation, the relay 714 is de-actuated and the switch 715 provides a reverse polarity to the dimmable window portion 704 via the reverse polarity terminals 717, thereby un-dimming (or clearing) the dimmable window portion 704. Thus, in this embodiment, the fail-safe mechanism 700 may rapidly provide a non-dimmed (or clear) condition of the dimmable window portion 704 in the event of a failure condition 722. It will be appreciated that fail-safe mechanisms, including fail-safe mechanisms of the type shown in FIGS. 11-13, may be incorporated into one of more of the various dimmable window systems described elsewhere in this patent application.

In yet another embodiment, each window 54, 56 may have one or more independently controllably dimmable areas. More specifically, an entire window may be controllably dimmable, or the window may have one or more portions that are independently controllably dimmable. When such a window is operably coupled to the control system 108, each dimmable area of the window may be operably coupled to the control system 108 such that the control system 108 is capable of individually controlling the transmissivity of each individual area. In one specific embodiment, a window may include a grid of individually controllably dimmable areas.

It will be appreciated that a variety of alternate embodiments may be conceived, and that the invention is not limited to the particular embodiments described above and shown in the accompanying figures. For example, in an alternate embodiment, the window assembly 110 shown in FIG. 4 may be that of a building, and the control system 108 may be configured to adjust a transmissivity of one or more window portions of the window assembly 110 in accordance with inputs from the sensor assembly 102, and may combine such inputs from the sensor assembly 102 with a pre-set schedule (e.g., to lower a transmissivity of one or more window portions during daylight hours, and raise a transmissivity of one or more window portions during nighttime hours). In further embodiments, systems and methods in accordance with the present invention may be adapted to provide dimmable windows for helicopters, automobiles, boats, trains, or any other suitable systems whereby variable light transmission is desired.

Further embodiments of the invention may be adapted to respond to a situation involving a sudden illumination of high-intensity light (e.g., laser attack). More specifically, in alternate embodiments, systems and methods in accordance with the present invention may respond to sudden illumination of high-intensity light (e.g., laser illumination) by reducing the maximum intensity of light entering the cockpit (or other structure), thereby preventing or at least partially mitigating the undesirable effects which may result from a non-attenuated sudden illumination of high-intensity light. Also, because current U.S. Federal Aviation Administration guidelines require air traffic controllers to inform pilots of a possible laser illumination, the pilots may preemptively adjust embodiments of dimmable window systems to prevent or reduce the possible adverse effects of a subsequent sudden illumination of high-intensity light (e.g., laser illumination).

Figure 7:
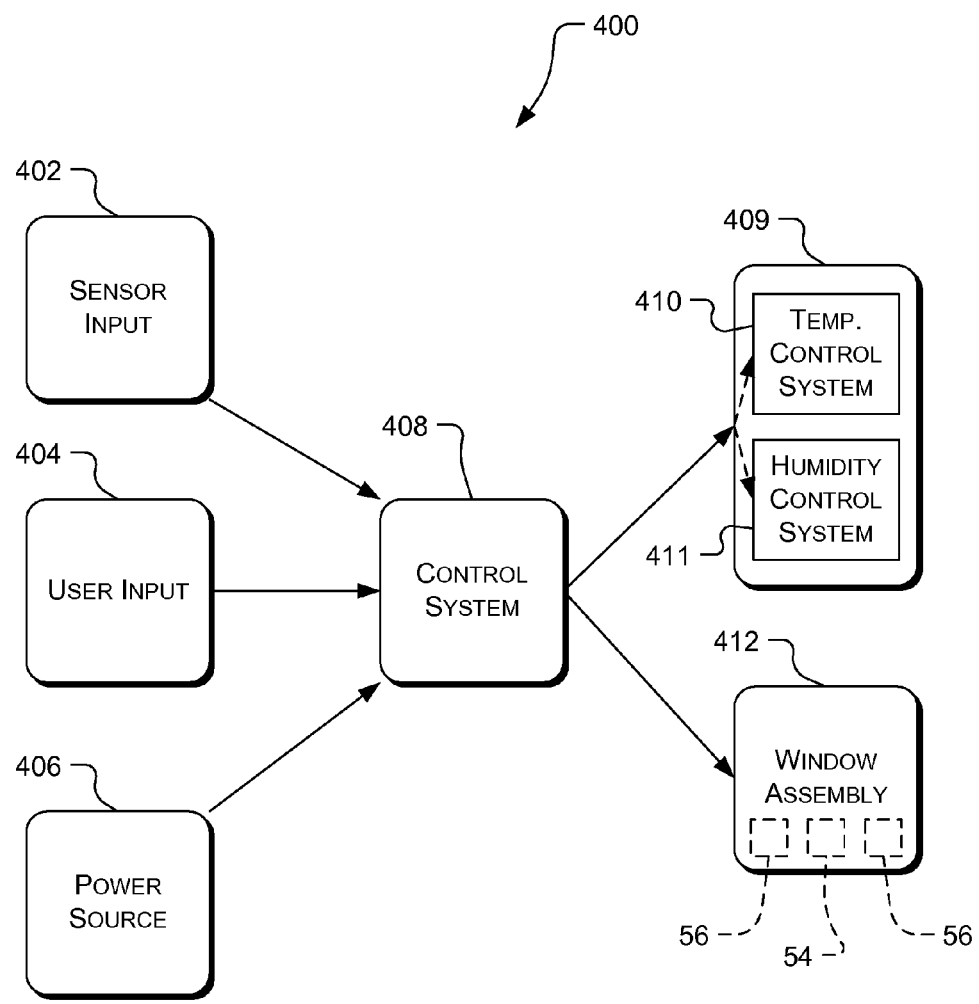
FIG. 7 is a schematic view of a dimmable window system operatively coupled to an environmental control system in accordance with another embodiment of the invention.

In further embodiments, systems and methods in accordance with the present invention may be coupled to an environmental control system to further improve or optimize the environment within the cockpit portion 52 of the aircraft 50, or the environment within any other desired structure. For example, FIG. 7 is a schematic view of a dimmable window system 400 in accordance with yet another embodiment of the invention. In this embodiment, the dimmable window system 400 includes a sensor assembly 402 adapted to receive one or more measured inputs within the cockpit portion 52, including, for example, a light measurement, and ambient temperature measurement, and a humidity measurement. A control system 408 is operatively coupled to the sensor assembly 402, to a window assembly 412 that includes at least one dimmable window portion (e.g., one or more dimmable portions of the front and side windows 54, 56), and to an environmental control system (ECS) 409. In this embodiment, the environmental control system 409 may include a temperature control system 410 and a humidity control system 411. The temperature and humidity control systems 410, 411 may be independently controllable. As her shown in FIG. 7, the dimmable window system 400 may further include a user input assembly 404 and a power source 406 coupled to the control system 408.

Figure 8:
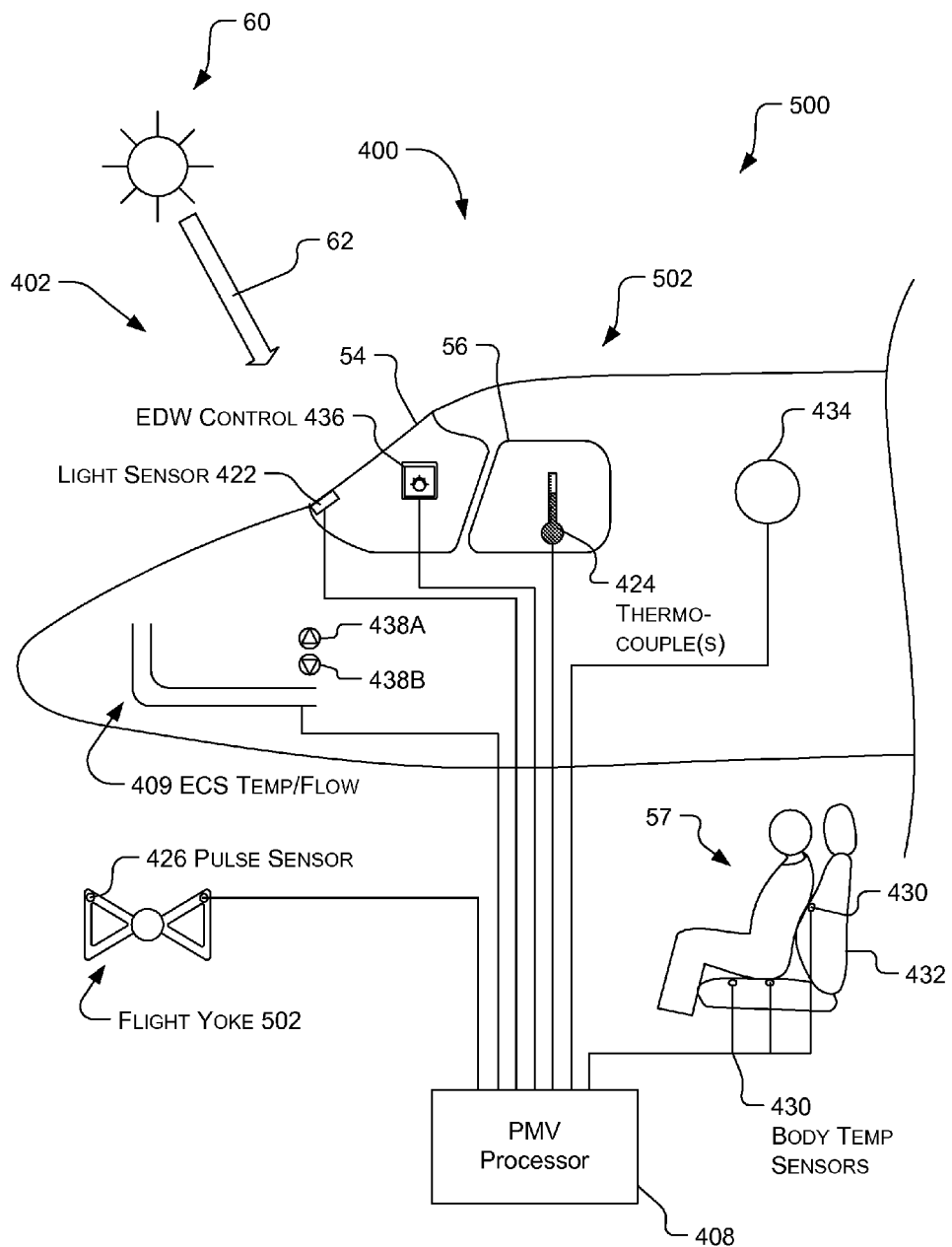
FIG. 8 is a side elevational schematic view of an aircraft having a cockpit portion that includes the dimmable window system of FIG. 7 in accordance with a further embodiment of the invention.

FIG. 8 is a side elevational schematic view of an aircraft 500 having a cockpit portion 502 that includes the dimmable window system 400 of FIG. 7 in accordance with a further embodiment of the invention. In this embodiment, the sensor assembly 402 includes one or more light sensors 422, an ambient temperature sensor 424, a pulse sensor 426 disposed within a flight yoke 428, a plurality of body temperature sensors 430 disposed within a pilot's seat 432, and a humidity sensor 434. The sensor assembly 402 is operatively coupled to the control system 408 which, in this embodiment, is adapted to assess an overall comfort level of an environment within the cockpit portion 502 of the aircraft 500. In one particular embodiment, the overall comfort level may be assessed based on a Predicted Mean Vote (PMV) as described, for example, in *Thermal Comfort, Analysis and Applications in Environmental Engineering*, by P. O. Sanger. As further shown in FIG. 8, in this embodiment, the user input assembly 404 includes an electrically dimmable window (EDW) controller 436, and one or more ECS controllers 438. More specifically, in one particular embodiment, the ECS controllers 438 include a temperature controller 438A and a humidity controller 438B.

Figure 9:
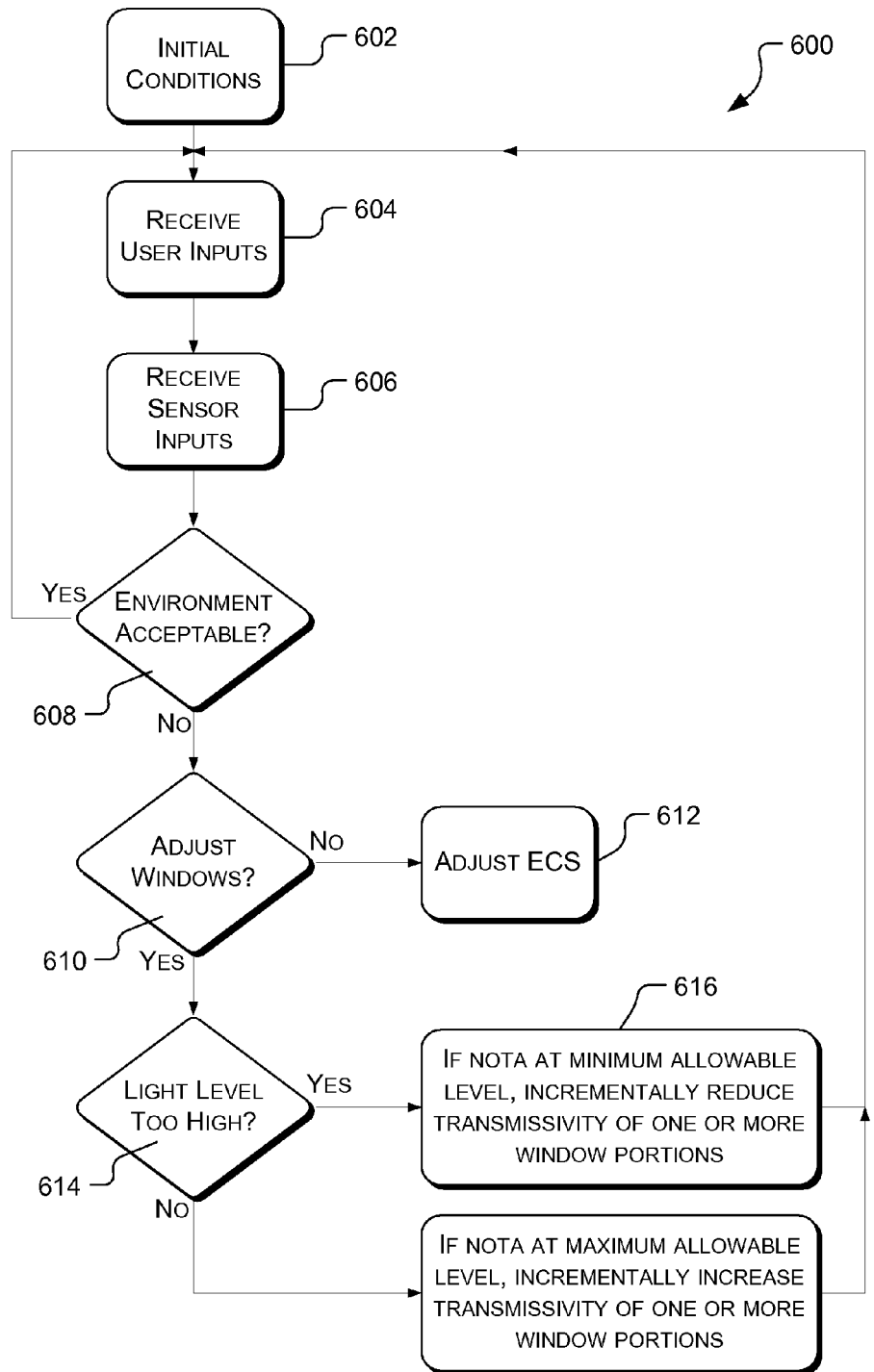
FIG. 9 is a flow chart showing a method of controlling an environment within the cockpit portion of the aircraft of FIG. 8 in accordance with an embodiment of the invention.

FIG. 9 is a flow chart showing a method 600 of controlling an environment within the cockpit portion 502 of the aircraft 500 of FIG. 8 in accordance with an embodiment of the invention. In this embodiment, the method 600 begins at a state of initial conditions at a block 602. At a block 604, one or more user inputs are received from the user input assembly 404. The user inputs may include, for example, a desired light level, a desired ambient temperature, and a desired humidity level within the cockpit portion 502. At a block 606, the method 600 receives one or more sensor inputs from the sensor assembly 402. The sensor inputs may include, for example, one or more measured light levels, measured ambient temperatures, and measured humidity levels within the cockpit portion 502. The control system 408 receives the sensor inputs and user inputs and determines whether the environment within the cockpit portion 502 is acceptable at a block 608. If the environment is acceptable (or within an acceptable range), then the method 600 returns to block 604.

If the environment is not acceptable (block 608), then the method 600 determines whether to adjust the transmissivity of one or more window portions of the window assembly 412. For example, in one particular embodiment, the control system 408 may determine that the changes necessary to the environment within the cockpit portion 502 are not achievable merely by adjusting the transmissivity of one or more window portions of the window assembly 412, but rather, requires direct adjustment of the ECS system 409 (e.g., by direct adjustment of the temperature control system 410, the humidity control system 411, or both). If the method 600 determines not to adjust the transmissivity of one or more window portions of the window assembly 412 (block 610), then the ECS system 409 is adjusted at block 612, and method 600 returns to block 604.

If the method determines that the transmissivity of the one or more window portions of the window assembly 412 (block 610) may be adjusted to correct the environmental condition within the cockpit portion 502, then at a block 614, the method 600 determines whether the light level within the cockpit portion 502 is too high. If so, then at a block 616, the transmissivity of one or more window portions of the window assembly 412 is incrementally reduced provided that the one more window portions are not already at a minimum allowable level, in the method 600 returns to block 604. Alternately, if the light level is not too high (block 614), the light level is deemed to be too low, and the transmissivity of one or more window portions of the window assembly 412 are incrementally increased provided that such portions are not already at a maximum level, and the method 600 returns to block 604.

Embodiments of methods and systems in accordance with the present invention may provide significant advantages over the prior art. For example, by combining a dimmable window system with an environmental control system, environment within the cockpit portion of the aircraft may be more optimally controlled. Thus, embodiments of the present invention may provide a greater degree of overlap between the comfort levels of the first and second pilots, including by controlling not only the ambient light levels within the cockpit, but also by simultaneously (or sequentially) controlling the ECS to provide an improved level of comfort (as might be indicated by an improved PMV) within the cockpit for both pilots.

Figure 10:
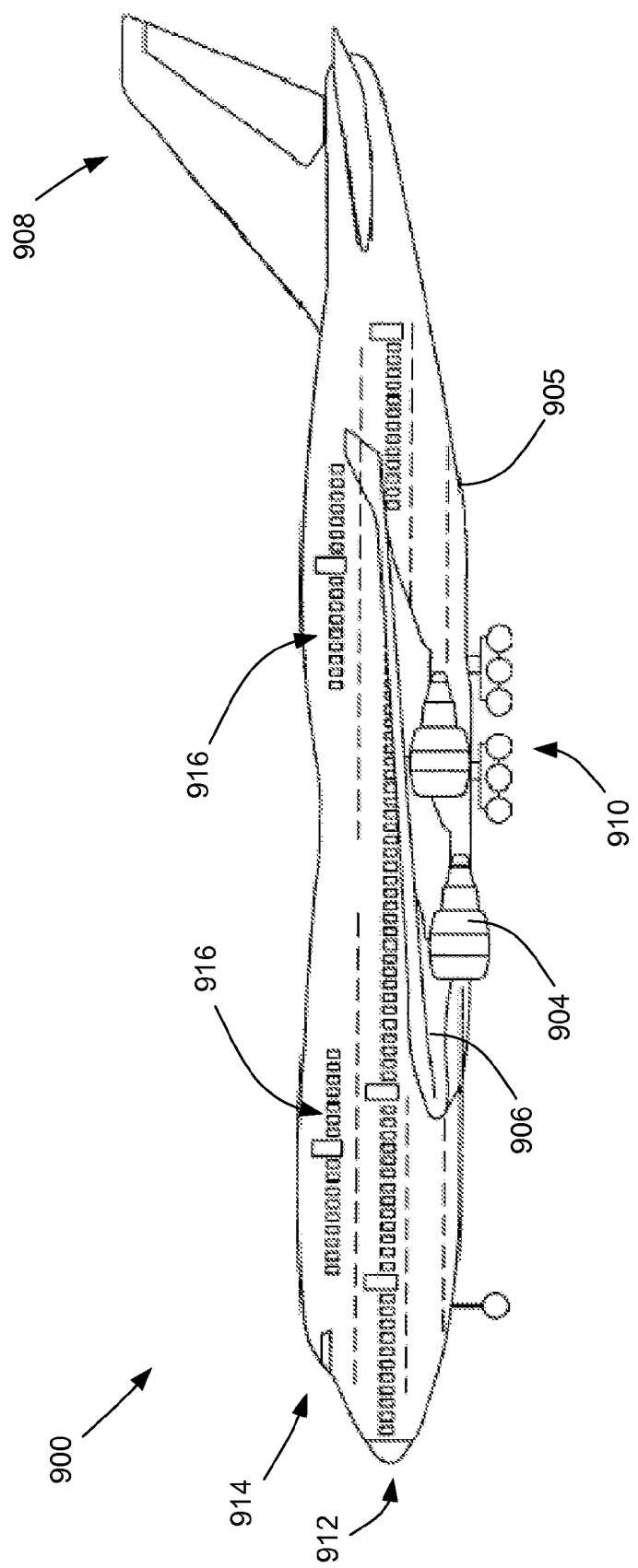
FIG. 10 is a side elevational view of an aircraft having a dimmable window system in accordance with yet another embodiment of the present invention.

Again, it will be appreciated that embodiments of dimmable window systems and methods in accordance with the present invention may be employed in a wide variety of circumstances and settings, including buildings, automobiles, aircraft, boats, and other suitable systems. For example, FIG. 10 is a side elevational view of an aircraft 900 having one or more window systems 914, 916 in accordance with an alternate embodiment of the invention. In this embodiment, the aircraft 900 includes a fuselage 905 including wing assemblies 906, a tail assembly 908, and a landing assembly 910. The aircraft 900 further includes one or more propulsion units 904, a control system 912 (not visible), and a host of other systems and subsystems that enable proper operation of the aircraft 900. It will be appreciated that embodiments of window systems in accordance with the present invention may be employed throughout the aircraft 900, including a cockpit window system 914, one or more passenger cabin window systems 916, and any other suitable areas of the aircraft 900. In general, except for the window systems 914, 916 in accordance with the present invention, the various components and subsystems of the aircraft 900 may be of known construction and, for the sake of brevity, will not be described in detail herein.

Although the aircraft 900 shown in FIG. 10 is generally representative of a commercial passenger aircraft, including, for example, the 737, 747, 757, 767, and 777 models commercially-available from The Boeing Company of Chicago, Ill., the inventive apparatus and methods disclosed herein may also be employed in the assembly of virtually any other types of aircraft. More specifically, the teachings of the present invention may be applied to the manufacture and assembly of other passenger aircraft, fighter aircraft, cargo aircraft, rotary aircraft, and any other types of manned or unmanned aircraft, including those described, for example, in The Illustrated Encyclopedia of Military Aircraft by Enzo Angelucci, published by Book Sales Publishers, September 2001, and in Jane's All the World's Aircraft published by Jane's Information Group of Coulsdon, Surrey, United Kingdom, which texts are incorporated herein by reference.

While preferred and alternate embodiments of the invention have been illustrated and described, as noted above, many changes can be made without departing from the spirit and scope of the invention. The embodiments described herein are suitable for use in any aircraft, automobile, boat, or any other system whereby controlled variable light transmission is desired. Accordingly, the scope of the invention is not limited by the disclosure of these preferred and alternate embodiments. Instead, the invention should be determined entirely by reference to the claims that follow.

What is claimed is:

1. A method of controlling a transmissivity of a window portion of a variable transmissivity window system, the method comprising:
    measuring an actual humidity level at a location;
    setting a desired humidity level for the location via a user input;
    incrementally adjusting a transmissivity of the window portion to maintain the desired humidity level, wherein the transmissivity is configured to be reduced using a first electrical input; and
    setting a minimum transmissivity limit for the window portion, wherein the minimum transmissivity limit is configured to provide visibility through the window portion,
    wherein incrementally adjusting the transmissivity comprises decreasing the transmissivity of the window portion to maintain the desired humidity level provided that the transmissivity is not at the minimum transmissivity limit.

2. The method of claim 1, further comprising setting a maximum light level for the window portion.

3. The method of claim 2, wherein incrementally adjusting the transmissivity comprises increasing the transmissivity of the window portion to maintain the desired humidity level provided that the a light level provided by the adjusted transmissivity does not exceed the maximum light level.

4. The method of claim 3, wherein increasing the transmissivity of the window portion further comprises increasing the transmissivity by interrupting the first electrical input.

5. The method of claim 3, wherein increasing the transmissivity of the window portion further comprises increasing the transmissivity using a second electrical input, wherein the second electrical input is configured with a polarity that is opposite of a polarity of the first electrical input.

6. The method of claim 1, wherein setting a minimum acceptable limit further includes setting a minimum acceptable limit of transmissivity that is configured to provide airborne visibility through the window portion.

7. The method of claim 1, further comprising terminating the transmissivity reduction generated by the first electrical input when the transmissivity of the window portion reaches the minimum transmissivity limit.

8. The method of claim 1, wherein incrementally adjusting the transmissivity of the window portion comprises varying a voltage value provided by the first electrical input to the window portion.

9. The method of claim 1, wherein the variable transmissivity window system comprises a plurality of window portions, and the method further comprises controlling a transmissivity of each window portion of the plurality of window portions.

10. The method of claim 1, further comprising incrementally adjusting the transmissivity of the window portion based on a pre-set time schedule, so as to reduce the transmissivity of the window portion during daylight hours, and raise the transmissivity of the window portion during nighttime hours.

11. A computer-readable medium having computer-executable instructions that, when executed, perform a method comprising:
    measuring an actual humidity level at a location;
    setting a desired humidity level for the location via a user input;

incrementally adjusting a transmissivity of a window portion to maintain the desired humidity level, wherein the transmissivity is configured to be reduced using a first electrical input; and setting a maximum light level for the window portion, wherein incrementally adjusting the transmissivity comprises increasing the transmissivity of the window portion to maintain the desired humidity level provided that a light level provided by the adjusted transmissivity does not exceed the maximum light level.

12. The computer-readable medium of claim 11, further comprising instructions for setting a minimum transmissivity limit for the window portion.

13. The computer-readable medium of claim 12, wherein instructions for incrementally adjusting the transmissivity comprise instructions for decreasing the transmissivity of the window portion to maintain the desired humidity level provided that the transmissivity is not at the minimum transmissivity limit.

14. The computer-readable medium of claim 13, further comprising instructions for terminating the transmissivity reduction generated by the first electrical input when the transmissivity of the window portion reaches the minimum transmissivity limit.

15. The computer readable medium of claim 11, wherein instructions for setting a minimum acceptable limit further includes setting a minimum acceptable limit of transmissivity that is configured to provide airborne visibility through the window portion.

16. The computer-readable medium of claim 11, wherein instructions for incrementally adjusting the transmissivity further comprise instructions for increasing the transmissivity by interrupting the first electrical input.

17. The computer-readable medium of claim 11, wherein instructions for incrementally adjusting the transmissivity of the window portion comprise instructions for varying a voltage value provided by a power source to the window portion.

18. The computer-readable medium of claim 11, wherein the variable transmissivity window system comprises a plurality of window portions, and the controller further comprises instructions for controlling a transmissivity of each window portion of the plurality of window portions.

19. The computer-readable medium of claim 11, further comprising instructions for incrementally adjusting the transmissivity of the window portion based on a pre-set time schedule so as to reduce the transmissivity of the window portion during daylight hours, and to raise the transmissivity of the window portion during nighttime hours.

20. The controller of claim 11, wherein instructions for increasing the transmissivity of the window portion further comprise instructions for increasing the transmissivity using a second electrical input, wherein the second electrical input is configured with a polarity that is opposite of a polarity of the first electrical input.

* * * * *

UNITED STATES PATENT AND TRADEMARK OFFICE
CERTIFICATE OF CORRECTION

PATENT NO.         : 7,355,161 B2                                             Page 1 of 1
APPLICATION NO.    : 11/383372
DATED              : April 8, 2008
INVENTOR(S)        : Emma Romig et al.

It is certified that error appears in the above-identified patent and that said Letters Patent is hereby corrected as shown below:

On the Title Page Item (75), delete

Craig Loges, Marysville, WA (US)

Signed and Sealed this

Fifteenth Day of July, 2008

JON W. DUDAS
*Director of the United States Patent and Trademark Office*